United States Patent [19]
Henry et al.

[11] 3,858,903
[45] Jan. 7, 1975

[54] AIR SPRING SYSTEM AND DAMPED AIR VALVE THEREFOR
[75] Inventors: Ormond L. Henry; Don S. Strader, both of Muskegon, Mich.
[73] Assignee: Lear Siegler, Inc., Santa Monica, Calif.
[22] Filed: Oct. 29, 1973
[21] Appl. No.: 410,465

[52] U.S. Cl. ...... 280/124 F, 267/65 D, 137/625.21, 251/54, 220/6 H
[51] Int. Cl. ............................................ F16k 11/02
[58] Field of Search ................. 280/121 F, 6 R, 6 H; 267/65 R, 65 D; 137/627.5, 625.21; 251/54

[56] References Cited
UNITED STATES PATENTS
3,181,854  5/1965  Backlund ............................ 267/65
3,563,270  2/1971  Denny ............................ 137/625.21

Primary Examiner—Philip Goodman
Attorney, Agent, or Firm—McGarry & Waters

[57] ABSTRACT
A system for controlling the height of a vehicle with respect to an axle and an air valve therefor wherein the air spring supports the vehicle on an axle and a damped air valve controls the flow of air to the air spring. The air valve is of the vane damping type and a pair of oppositely disposed vanes, each with a check valve. One check valve prevents the flow of fluid through one vane when the vanes move in one rotational direction. Another check valve prevents the flow of fluid through the other vane when the vanes move in an opposite second direction. Bypass cavities in the damping chamber permit the vanes to return freely toward a neutral or central position after a damped movement away from such neutral or central position. The bypass cavities do not extend to the neutral or central position so that the movement of the vanes is damped as the vanes approach the central position. The damping chamber desirably includes upper and lower portions symmetrical about an actuator shaft and one vane extends into each portion of the cavity. Reservoir cavities are provided also in the upper and lower portions of the damping chamber so that the valve can be used on either side of the vehicle with the position of the valve on one side inverted with respect to the position on the other side.

12 Claims, 6 Drawing Figures

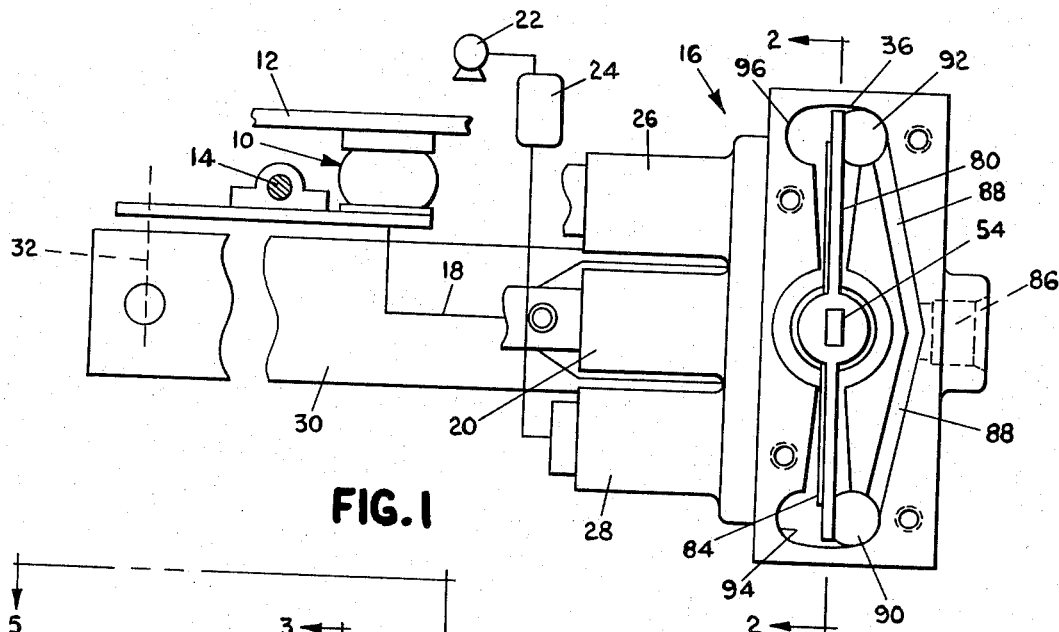
FIG. 1
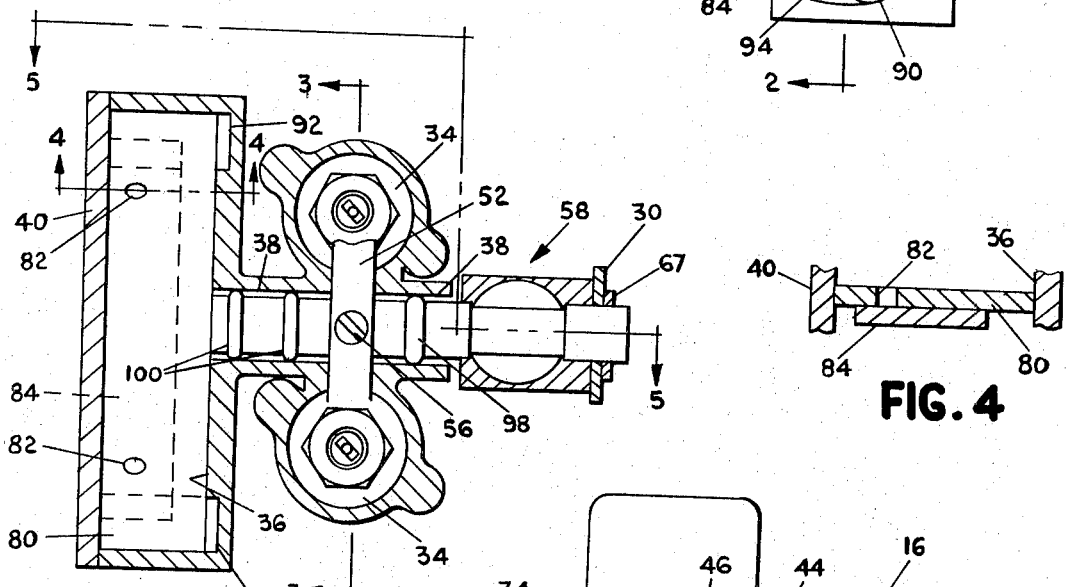
FIG. 2
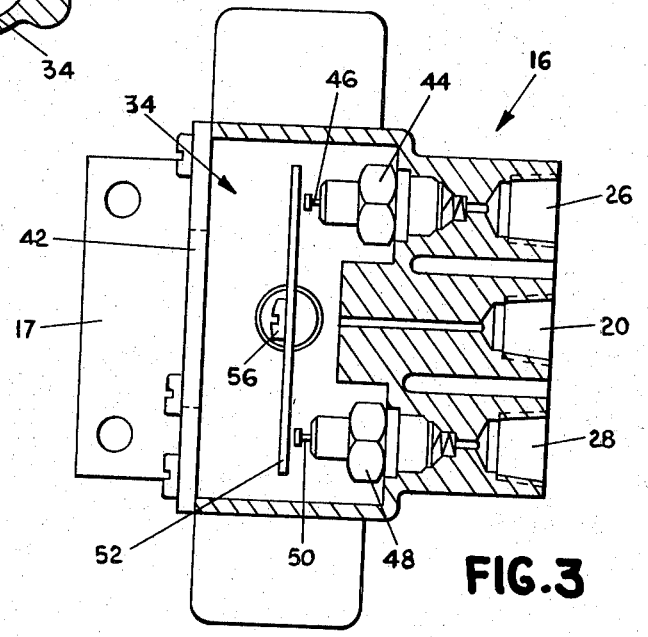
FIG. 3
FIG. 4

AIR SPRING SYSTEM AND DAMPED AIR VALVE THEREFOR

BACKGROUND OF THE INVENTION

1. Field of the Invention

This invention relates to air spring systems for vehicles and to damped air valves therefor. In one of its aspects, the invention relates to a damped air valve having a damping chamber in which the movement of actuating members are damped from a neutral position but are undamped in return movement to the neutral position, except just before the exact neutral position is reached. In another of its aspects, the invention relates to a damping air valve for vehicles wherein the valve is symmetrical about a horizontal axes so that it can be used interchangeably with either end up on opposite sides of the vehicle.

2. State of the Prior Art

Air suspension systems for vehicles are well-known and have been used extensively in automobiles as well as commercial vehicles. Such valves are disclosed, for example in United Kingdom Patent No. 444,540 to Faudi, and in the U.S. Patents to Christensen Nos. 2,970,614; Jackson et al. 3,060,963; Smirl 3,082,018; Smirl 3,162,433; Backlund 3,181,854; Kurichh 3,508,585; Denny 3,563,270; and Okuyama 3,659,870. In all such systems, a leveling valve controls the pressure in the air spring responsive to changes in load as reflected by the level of the vehicle with respect to the axle. However, the level oscillates as the spring responds to road vibrations. The valve operation must thus be damped so that the valve does not respond to oscillatory changes in level.

In most valves, the air is supplied to the air spring through an air cavity in the damping valve and the air supply conduit is provided with a normally closed valve. Operation of the valve in the air supply conduit admits more air to the air spring. In like manner, air is exhausted from the air spring through a valved conduit.

In the system of Backlund, for example, a torque is applied to an actuating shaft which mounts an air valve actuator in an air chamber and a damping vane in a fluid filled damping cylinder. Rotation of the actuating shaft in one direction will open the air supply valve to inflate the air spring and rotation of the actuator shaft in the opposite direction will open the exhaust valve to deflate the air spring. The damping vane is considerably samller than the damping chamber but has auxiliary vanes on either side thereof which are biased in contact with the vane to restrain the movement of the vane away from the neutral or central position. The auxiliary vanes have holes which permit the vanes to return relatively undamped to the central position. The auxiliary vanes are prevented from moving past the central point to the opposite side of the damping chamber.

Such systems, while preventing the relative free movement of the vanes back to a neutral position, do not apply any retarding force until the vanes have fully returned to the central position. Thus the vanes are subject to some hunting around the center point. Further, leakage of fluid may occur through the opening in the auxiliary vane so that the damping rates might vary from time to time and from side to side.

Other valves having similar vane type damping chambers are disclosed in the U.S. Pat. Nos. to Smirl 3,082,018 and 3,162,433.

SUMMARY OF THE INVENTION

According to the invention, a damped air valve has a construction which allows the valve to be inverted for use on either side of the vehicle. Further, the valve provides a uniform damping rate for movement of an actuator shaft away from a neutral position and an undamped movement back to a position just short of the neutral or center position to avoid hunting around a center point.

The valve according to the invention has an air chamber preferably sealed, a fluid filled damping chamber, also preferably sealed, valved conduits coupling the air spring with a source of air pressure and with the atmosphere for exhausing air from the air spring, means for actuating the valves in the valved conduits responsive to changes in the height of the vehicle with respect to the axle. A common actuator shaft extends into both the air and damping chambers and means are provided for applying a torque to the actuator shaft. A vane in the damping cavity secured to the actuator shaft is mounted for movement within the damping cavity with the dimensions of the vane approximating that of the damping cavity portion in which the vane moves to permit slow passage of the fluid around the vanes upon movement of the vanes within the cavity. The vane has a check valve to permit the vane to return quickly to a neutral position after damped movement away from the neutral position. The damping chamber also forms a bypass cavity to permit the fluid to bypass the vane when the vane returns to the neutral or central position after movement to an opposite side of the damping cavity. Desirably, the damping chamber comprises two identical portions, each having a vane secured to a common shaft for movement together. Thus, the movement of the vanes away from the neutral or central point is damped by the check valve but return to the center or neutral point is undamped until the vanes approach the neutral position. As the vanes near the center point, the movement is retarded to prevent hunting of the vane around the center point.

The upper and lower portions of the damping chamber are disposed symmetrically above and below the actuator shaft respectively so that the valve can be used in right-side-up or inverted positions. This permits the valve to be used on either side of the vehicle with the position on one side being inverted with respect to the position on the other side.

To assist in the use of the valve in either position, a reservoir cavity is provided in each of the upper and lower portions of the damping chamber. In the event that air bubbles are present in the damping fluid, the air bubbles will migrate to the reservoir cavity and will not affect the damping movent of the vane.

BRIEF DESCRIPTION OF THE DRAWINGS

The invention will now be described with reference to the accompanying drawings in which:

FIG. 1 is a schematic view of an air spring system including an end view of the valve according to the invention with an end plate thereof removed;

FIG. 2 is a sectional view taken along lines 2—2 of FIG. 1;

FIG. 3 is a sectional view taken along lines 3—3 of FIG. 2;

FIG. 4 is a partial sectional view taken along lines 4—4 of FIG. 2;

DESCRIPTION OF THE PREFERRED EMBODIMENT

Figure 5:
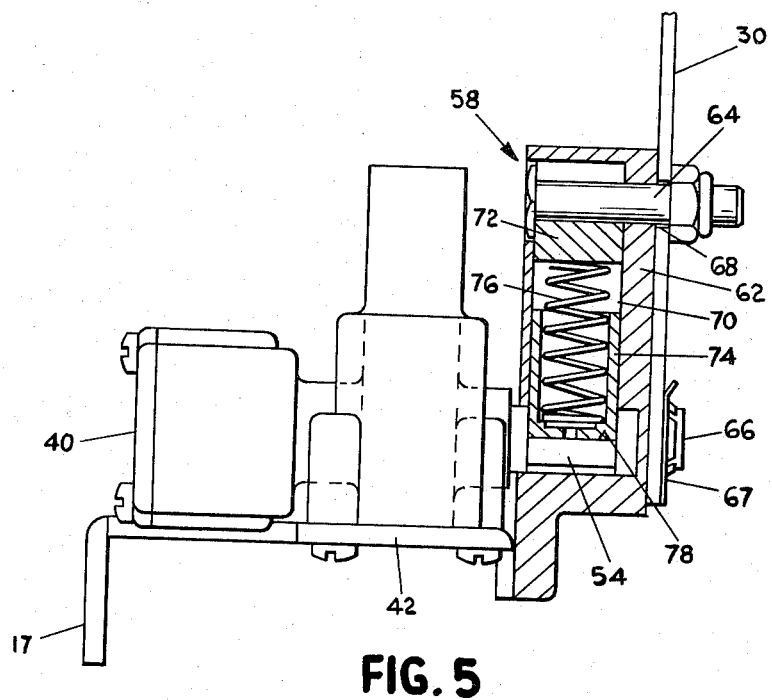
FIG. 5 is a view taken along lines 5—5 of FIG. 2.

Referring now to the drawings, and to FIG. 1 in particular, there is shown an air spring system for supporting a vehicle. The air spring 10 is mounted between a vehicle frame 12 and a vehicle axle 14 on a suspension system. A damped air valve 16 controls the flow of air to and from the air spring 10 through an open port 20 in the air valve and through an air line 18. A compressor 22 supplies air to an air tank 24 which in turn is connected through a suitable conduit to a valve inlet port 28 in the air valve 16. A valved exhaust port 26, similar in structure to the valve inlet port 28, is provided diametrically opposite the inlet port 26.

A lever 30 is mounted to the valve through a torque coupler for operating the air valve and, at its free outer end, is coupled through a connection 32 to the suspension system for the axle 14. The valve is mounted through means (not shown) to the vehicle frame 12.

Reference is now made to FIGS. 2 and 3 for a description of the air chamber in the air valve 16. A two lobe air chamber 34 and a damping chamber 36 are formed in the valve and are connected through a lateral bore 38. An end plate 42 is provided to seal the chamber 34 and an end plate 40 seals the damping chamber 36.

As illustrated in FIG. 3, the exhaust 26 has a valve 44 with a spring loaded release member 46 and the inlet port 28 has a valve 40 with spring loaded release member 50. The valves 44 and 48 are normally closed and are opened to permit passage of air therethrough upon depression of release members 46 and 50 respectively A paddle 52 is secured to an actuator shaft 54 through a suitable screw 56. Rotation of the paddle 52 in a clockwise direction as in FIG. 3 will depress the release member 46 thereby exhausting air through the check valve 44. Rotation of the paddle 52 in a counterclockwise direction as viewed in FIG. 3 will depress the release member 50 and admit air into the air chamber 34 through check valve 48. Since the port 20 is open to the air spring, opening of the valve 44 will result in decreasing the air pressure in the air spring 10 and opening of port 48 will cause an increase of air pressure in the air spring 10.

A bracket 17 is provided for securing the air valve 16 to the frame 12 to suitable means (not shown).

A torque is applied to the actuator shaft 54 through a torque mechanism 58 for rotation of the actuator shaft 54 responsive to changes in the vehicle load. Reference is now made to FIG. 5 for a description of the torque mechanism 58.

The torque mechanism 58 comprises a block 62 which is secured to the lever 30 through a bolt 64 and through a boss 66 on the valve housing. A retainer washer 67 desirably is provided in the boss 66 for retaining the lever 30 thereon. Preferably, the bolt 64 extends through a slot 68 in the lever 30 so that the lever 30 can be adjusted somewhat with respect to the block 62.

The block 62 has a chamber 70 with a spring 76 biased between a stop 72 and a piston 74. The lower end of the piston 74 abuts a flat surface 78 of the actuator shaft 54. The upper end of the stop 72 abuts the bolt 64.

In operation, as the lever 30 is pivotably moved with respect to the frame 12, the block 62 will rotate about the actuator shaft 54. As it rotates, the piston 74 will be moved upwardly with respect to the actuator shaft 54 due to the flat side 78 thereof. The pressure of the piston 74 against the side or edge of the flat side 78 will apply a torque to the actuator shaft 54 tending to rotate the shaft in the direction of the handle.

The rotation of the actuator shaft 54 is damped by means 80 in the damping chamber 36. Reference is now made to FIGS. 1, 2 and 4 for a description of the damping chamber and the damping mechanism.

The damping chamber 36 is symmetrical about the horizontal plane through the actuator shaft 54. The damping chamber 36 is normally filled with a viscous fluid such as a silicone fluid or a hydraulic fluid. A pair of vanes 80 are secured non-rotatably to the shaft 54 for movement therewith in the damping chamber 36. Holes 82 are provided in each of the vanes for passage of fluid therethrough but the holes are covered by flexible covers 84 to prevent passage of the fluid in one direction through the holes. The vanes 80 are actually formed of a single piece of plastic material and can be considered as either a single vane extending into two portions of the damping coupling or a pair of vanes rigidly joined together and pivotable about a common mounting shaft.

A filling spout 86 is connected to the damping chamber 36 through a pair of bypass channels 88 at one side thereof with the wells extending laterally of the level of the cavity as seen in FIG. 2. Reservoir cavities 94 and 96 are provided at the other side of the damping chamber to compensate for any air bubbles in the fluid. The vane 80 fits reasonably tightly within the damping cavity so that the fluid flows slowly around the vanes as the vanes move within the cavity (except at channels 90, 92 where the fluid is allowed to bypass around the side of the vanes).

O-rings 98 and 100 seal the two-lobe air chamber 34 and the damping chamber 36 at the bore 38.

The operation of the damping valve will now be described with reference to FIGS. 1, 2 and 6. When the lever 30 applies a torque to the actuator shaft 54 through the torque mechanism 58 in a manner which has been described above, the torque is a counterclockwise torque as viewed in FIGS. 1 and 6, the vanes will attempt to move in a counterclockwise direction, but will be restrained from movement by the viscous fluid in the damping chamber 36. The cover 84 at the upper vane 80 prevents the fluid from passing through the upper hole 82 in upper vane 80. Fluid flows freely through the hole 82 in the lower vane 80. The relationship between the vanes 80 and the chamber 36 is such that a small tolerance is provided between the two so that the fluid flows slowly around the vane from one side thereof to the other thus permitting the vanes to move slowly in a counterclockwise direction, assuming that the torque is maintained. If the torque is of short duration, obviously, the vanes will have very limited, if any, movement and the actuator shaft 54 will have a correspondingly small movement.

Figure 6:
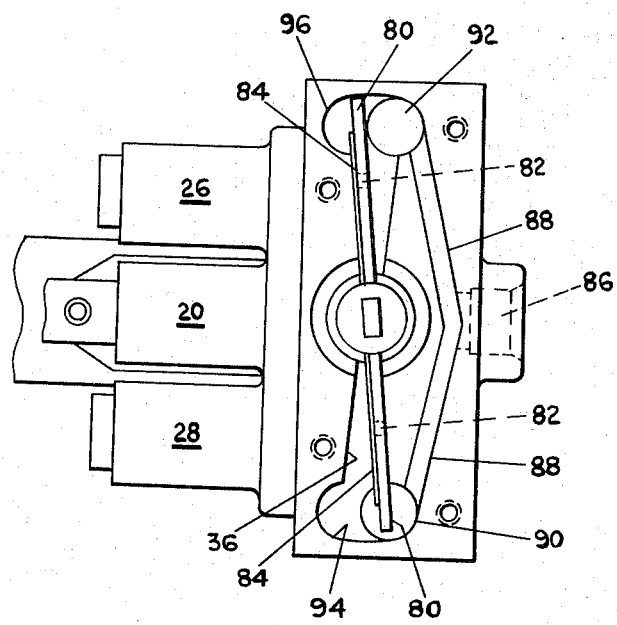
FIG. 6 is a partial view similar to FIG. 1 illustrating the valve in a different operative condition.

However, assuming that the torque continues, the vanes 80 will eventually move to the position illustrated in FIG. 6. As indicated above, the vane movement to this position is relatively slow as the damping fluid must move around the upper vane as the vanes move in the counterclockwise direction. When the vanes are in this position, the shaft 54 will be rotated and will cause the paddle 52 to rotate in a clockwise direction as viewed in FIG. 3 (FIGS. 1 and 3 are views looking in opposite directions) so that the paddle 52 will depress the release member 46. Air will thus be exhausted from the air spring 10 until the lever 30 returns to a neutral position. Upon returning to the neutral position, the lever will relieve the torque on the actuator shaft 54. If the actuator shaft moves slowly back to the neutral position, the air is likely to be overexhausted to the air spring which would eventually cause an opposite reaction to increase the air to the air spring. Thus, the actuator shaft is required to return quickly to its neutral position in order to prevent hunting around the neutral position. The novel structure of the valve permits the actuator shaft 54 to move very quickly back to the neutral position. As seen in FIG. 6, when a clockwise torque is applied to the vanes 80, the fluid can flow from the right side of the upper vane through the upper hole 82. Flow of fluid through the hole in the lower vane 80 will be prevented, however, by the lower flexible cover 84. On the other hand, the lower vane 80 is over the well 90 during the movement of the vanes from the position illustrated in FIG. 6 to the position illustrated in FIG. 1. Thus, the fluid flows freely around the lower vane 80 until the vanes reach a position just short of center or neutral position. At that point the bypass through well 90 will cease and the vanes will move into neutral position at a retarded or damped rate. Thus, the vanes will return quickly to a point just short of the center and will be damped in the movement to the exact center. This damping action just short of center prevents hunting of the actuator shaft around a neutral position.

The operation of the valve has been described with respect to rotation of the actuator shaft in a counterclockwise direction as viewed in FIGS. 1 and 6. However, it is obvious that the valve would operate in a like manner (except for depressing the release member 50) upon rotation of the actuator shaft in a clockwise direction (as viewed in FIGS. 1 and 6), and an opposite result would occur in the air spring 10.

The damping valve according to the invention provides an effective damping of the air valve and which further prevents hunting of the damping means around a neutral point.

The valve described above can be used interchangeably on either side of the vehicle. For example, the system described above would be used, for example, on the left side of the vehicle (facing the front of the vehicle from the rear). In order to use the valve on the opposite side of a vehicle, the valve is inverted and then secured directly to the left side of the vehicle. In the inverted position, the valve outlet port 26 would become the inlet and the valve inlet port 28 would become the valve outlet port. However, the physical location of the inlet and outlet ports remain the same on both sides of the valve. In other words, the connection to the air pressure supply means remains at the bottom of the valve and the exhaust port remains at the top of the valve regardless of which side of the vehicle on which the valve is used. Further, in the inverted position, the lower lever will always be in position ready for use and need not be further adjusted. In other words, the valve needs no adjustment to be mounted on the right or left side of the vehicle. Other types of valves which need to be rotated about a vertical axis for use on the other side of the vehicle require other modifications to adapt the valves for use on opposite sides of vehicles.

Reasonable variation and modification are possible within the scope of the foregoing disclosure, drawings, and the appended claims without departing from the spirit of the invention.

The embodiments of the invention in which an exclusive property or privilege is claimed are defined as follows:

1. In a system for controlling the height of a vehicle with respect to an axle wherein an air spring supports the vehicle on an axle and an air valve controls the flow of air to the air spring and wherein the air valve comprises:

a valve body having an air chamber;

valved conduits in said valve body coupling said air spring with a source of air pressure and coupling said air spring with the atmosphere for exhausting air from said air spring;

means for actuating valves in the valve conduits responsive to changes in the height of said vehicle with respect to said axle, said actuating means including means movable from a neutral position to a valve operating position and returnable to said neutral position;

means for damping the movement of said actuating means away from a neutral position, said damping means including at least one vane in a fluid containing damping chamber with the dimensions of said vane approximating that of said damping cavity portion in which said vane moves to permit slow passage of fluid around said vane upon movement of said vane within aid cavity;

the improvement in said damping means which comprises:

an opening and a check valve in said vane to permit flow of fluid through said opening when said vane moves in a first direction and to prevent flow of fluid through said opening when said vane moves in an opposite second direction; and bypass means in said damping chamber to permit passage of said fluid around said vane when said vane moves toward said neutral position in said second direction;

whereby the movement of said vane is damped in its movement in said second direction from said neutral position but is undamped in its movement in said first direction, and is undamped in its movement in said second direction toward said neutral position.

2. A system for controlling the height of a vehicle according to claim 1 wherein said damping means further comprises a second vane in said fluid cavity, said second vane being coupled to said first vane for rotational movement therewith; an opening and a check valve in said second vane to permit fluid to flow through said opening in said second vane when said second vane moves in said second direction and to prevent fluid from flowing through said opening in said second vane when said second vane moves in said first direction; and bypass means in said damping chamber to permit fluid to flow around said second vane as said second vane moves in said first direction toward a neutral position.

3. A system for controlling the height of a vehicle according to claim 2 wherein said bypass means for said first and second vanes permits said vanes to move freely to a point just short of said neutral position and damp the movement of said vanes as said vanes approach said neutral position.

4. A system for controlling the height of a vehicle according to claim 3 wherein said damping chamber includes vertically disposed upper and lower portions and said first vane is disposed in said upper portion and said second vane is disposed in said lower portion.

5. A system for controlling the height of a vehicle according to claim 4 wherein each portion of said damping chamber includes reservoir cavities to avoid deleterious effects of air bubbles in said fluid.

6. A system for controlling the height of a vehicle according to claim 1 wherein said bypass means permits said vane to move freely toward said neutral position in said second direction to a point just short of said neutral position, whereby the movement of said vane is damped as said vane moves into said neutral position in said second direction.

7. A system for controlling the height of a vehicle according to claim 1 wherein said air chamber and said damping chamber are sealed from each other.

8. A system for controlling the height of a vehicle according to claim 1 wherein said damping means further includes an actuator shaft rotatably mounted in said valve body and extending into said air and damping cavities, said actuator shaft being secured non-rotatably to said vane.

9. A system for controlling the height of a vehicle according to claim 1 wherein said bypass means includes a lateral indentation in said damping cavity in edge relationship to said vane.

10. A system for controlling the height of a vehicle according to claim 1 wherein said damping means further comprises a second opening and a second check valve in said vane spaced from said first check valve, said second check valve permitting the flow of fluid therethrough when said vane moves in said second direction and preventing flow of fluid therethrough when said vane moves in said first direction, and bypass means in said damping chamber to permit fluid to flow around said vane as said vane moves in said first direction toward said neutral position.

11. In an air control valve for operating an air spring responsive to changes in the load on said air spring, said valve having a body with a sealed air chamber and a sealed, fluid filled damping chamber, valved conduits in said air chamber for coupling said air spring to a source of air pressure and to exhaust air from said air spring, means for actuating the valve in said valved conduit to control the flow of air through said air chamber, said control means including a common actuator shaft in said air and damping chambers, a vane secured non-rotatably to said actuator shaft in said damping chamber to damp the movement of said shaft, the improvement which comprises:

said damping cavity comprising first and second portions extending vertically above and below said shaft respectively and said vane extending into both portions of said damping cavity, whereby said control valve can be used in right side up or inverted position without alteration of the damping rate of said control valve.

12. An air control valve according to claim 11 and further comprising first and second reservoir cavities connected to said portions of said damping cavities for eliminating air pockets in said damping cavities regardless of the orientation of said valve.

* * * * *